United States Patent
Ren et al.

(10) Patent No.: US 8,337,351 B2
(45) Date of Patent: Dec. 25, 2012

(54) HYBRID POWER DRIVING SYSTEM

(75) Inventors: Yi Ren, Shenzhen (CN); Ruru Niu, Shenzhen (CN); Xiaojun Liu, Shenzhen (CN)

(73) Assignee: BYD Co. Ltd. (CN)

( * ) Notice: Subject to any disclaimer, the term of this patent is extended or adjusted under 35 U.S.C. 154(b) by 301 days.

(21) Appl. No.: 12/466,716

(22) Filed: May 15, 2009

(65) Prior Publication Data

US 2009/0298634 A1 Dec. 3, 2009

(30) Foreign Application Priority Data

May 30, 2008 (CN) .......................... 2008 1 0108657

(51) Int. Cl.
*F16H 3/72* (2006.01)
(52) U.S. Cl. .......................................... 475/5; 475/311
(58) Field of Classification Search .............. 475/5, 149, 475/150, 154, 331, 317; 477/3, 4, 5, 6; 180/62.21, 180/65.225, 65.23, 65.245, 65.25
See application file for complete search history.

(56) References Cited

U.S. PATENT DOCUMENTS

| | | | |
|---|---|---|---|
| 5,492,189 A | 2/1996 | Kriegler et al. | |
| 5,562,565 A | 10/1996 | Moroto et al. | |
| 6,176,808 B1 | 1/2001 | Brown et al. | |
| 6,302,227 B1 | 10/2001 | Takemura et al. | |
| 6,991,054 B2 * | 1/2006 | Takaoka et al. | 180/65.235 |
| 7,175,555 B2 * | 2/2007 | Kozarekar et al. | 475/5 |
| 7,478,690 B2 * | 1/2009 | Kim | 180/65.25 |
| 7,727,100 B2 * | 6/2010 | Bucknor et al. | 475/5 |
| 2006/0025264 A1 * | 2/2006 | Sowul et al. | 475/5 |
| 2006/0046886 A1 * | 3/2006 | Holmes et al. | 475/5 |
| 2006/0108162 A1 * | 5/2006 | Tabata et al. | 180/65.2 |
| 2007/0087893 A1 * | 4/2007 | Tabata et al. | 477/3 |
| 2007/0093341 A1 * | 4/2007 | Supina et al. | 475/5 |
| 2007/0184928 A1 * | 8/2007 | Yasui et al. | 475/5 |
| 2007/0205735 A1 | 9/2007 | Kiuchi et al. | |
| 2007/0293362 A1 * | 12/2007 | Kamada et al. | 475/5 |
| 2007/0298923 A1 * | 12/2007 | Raghavan | 475/5 |
| 2008/0004156 A1 * | 1/2008 | Tabata et al. | 477/3 |
| 2008/0196955 A1 * | 8/2008 | Minamikawa | 180/65.2 |
| 2009/0082166 A1 * | 3/2009 | Wittkopp et al. | 475/311 |

FOREIGN PATENT DOCUMENTS

CN 1389358 A 1/2003

(Continued)

OTHER PUBLICATIONS

EPO Office Action mailed Mar. 8, 2011, for related patent application No. 09 753 412.7-2421.

(Continued)

*Primary Examiner* — Ha D. Ho
*Assistant Examiner* — Jude Agendia
(74) *Attorney, Agent, or Firm* — Brinks Hofer Gilson & Lione

(57) ABSTRACT

A hybrid power driving system includes a planetary gear mechanism having a first rotating component, a second rotating component, and a third rotating component. The system also includes an electric motor operatively coupled to the first rotating component, a clutch, an internal-combustion engine operatively coupled to the first rotating component by the clutch, and a brake operatively coupled to the second rotating component and configured to control the second rotating component in a locked position or in an unlocked position. The third rotating component is operatively coupled to an output end to provide rotational power.

15 Claims, 3 Drawing Sheets

FOREIGN PATENT DOCUMENTS

| | | |
|---|---|---|
| CN | 1618643 A | 5/2005 |
| CN | 1757533 A | 4/2006 |
| JP | 2000-255285 A | 9/2000 |
| JP | 2001-113971 A | 4/2001 |
| WO | WO 2006/029878 | 3/2006 |

OTHER PUBLICATIONS

International Search Report dated Aug. 11, 2009 issued in related International Application No. PCT/CN2009/000560.

* cited by examiner

HYBRID POWER DRIVING SYSTEM

CROSS-REFERENCE TO RELATED APPLICATIONS

This application claims the benefit of priority to Chinese Patent Application No. 2008-10108657.4 filed on May 30, 2008, entitled "A Hybrid Power Driving System."

TECHNICAL FIELD

The present invention relates to a hybrid vehicle, more particularly to a hybrid power driving system for the hybrid vehicles.

BACKGROUND

Because of the shortage of the energy and the strict requirements of vehicles to be environment friendly, automobile manufacturers have begun to focus on the hybrid vehicles. Moreover, hybrid vehicles manufacturers have combined the internal-combustion engine, which has great power performance, with the electric motor, which is environmental friendly. Therefore, many car manufacturers have invested great manpower and financial resources in the research and development of hybrid vehicles.

In hybrid vehicles, there are two common power sources, namely, the motor, which is driven by electricity, and the internal-combustion engine, which is driven by fuel. According to different operating modes, the hybrid power driving system is conventionally divided into a serial driving system, a parallel driving system, and a serial and parallel driving system. In the serial driving system, the engine drives the electric motor to generate electricity, and the generated power drives the motor to supply power for the vehicle.

In the parallel driving system, the engine and the motor both drive the wheels. Different ways of using the two power sources can be selected according to different driving modes. However, the above-mentioned driving modes are relatively simple and do not make full use of the environmental friendly and energy saving features, and thus such systems are limited.

Chinese application CN2693516Y discloses a driving system for the hybrid power vehicles, as shown in FIG. 1. The driving system includes an engine 100, a motor 200 and a planetary gear mechanism, where the planetary gear mechanism includes an internal ring gear 400, a planet carrier 500, which carries the planet gears, and a sun gear 600. The motor 200 transmits the power to the internal ring gear 400 via a gear 300, and the engine 100 may transmit the power to sun gear 600, and power from both are combined via the planet carrier.

It can be seen from the drawings and description of CN2693516Y that because the motor 200 and engine 1 transmit power to different components of the planetary gear mechanism, multiple brake and clutches are required to work under multiple working modes effectively. Therefore, the above driving system has many components, and the structure is relatively complex, rendering precise control of the system difficult.

SUMMARY

In one embodiment of the present invention, a hybrid driving system includes a planetary gear mechanism having a first rotating component, a second rotating component, and a third rotating component, where an electric motor is operatively coupled to the first rotating component. Also included is a clutch, and an internal-combustion engine operatively coupled to the first rotating component through the clutch. A brake is operatively coupled to the second rotating component and configured to control the second rotating component to operate in a locked position or in an unlocked position. The third rotating component is operatively coupled to an output end to provide rotational power. Optionally, the first rotating component is a planet carrier of the the planet gear mechanism, the second rotating component is a sun gear of the planet gear mechanism, and the third rotating component is a ring gear of the the planet gear mechanism. Advantageously, the second rotating component is a ring gear of the planet gear mechanism. The hybrid driving system is capable of working under a pure motor driving working mode while the clutch is disengaged and the brake locks the sun gear, where the power of the motor is transmitted to the output end via the planet carrier and the ring gear.

In another embodiment, the hybrid driving system is capable of working under pure engine driving working mode while the clutch is engaged, and the brake locks the sun gear, and the power of the engine is transmitted to the output end via the clutch, planet carrier and ring gear.

In another embodiment, the engine and motor operate in a driving working mode while the clutch is engaged, and the brake locks the sun gear, and the power of the motor and engine is transmitted to the output end via the planet carrier and ring gear.

In another embodiment, the hybrid driving system operates in a parking generating mode while the clutch is engaged, and the brake unlocks the sun gear, and the engine drives the motor to generate electricity.

The motor is capable of starting the engine while the clutch is engaged and the brake unlocks sun gear, whereby the rotation of main shaft of motor is transmitted to the main shaft of the engine via the planet carrier. The motor converts part of the mechanical energy transmitted by the planet carrier into electricity.

DESCRIPTION OF THE PREFERRED EMBODIMENTS

The aforementioned features and advantages of the invention as well as additional features and advantages thereof will be more clearly understood hereafter as a result of a detailed description of the following embodiments when taken conjunction with the drawings.

Figure 1:
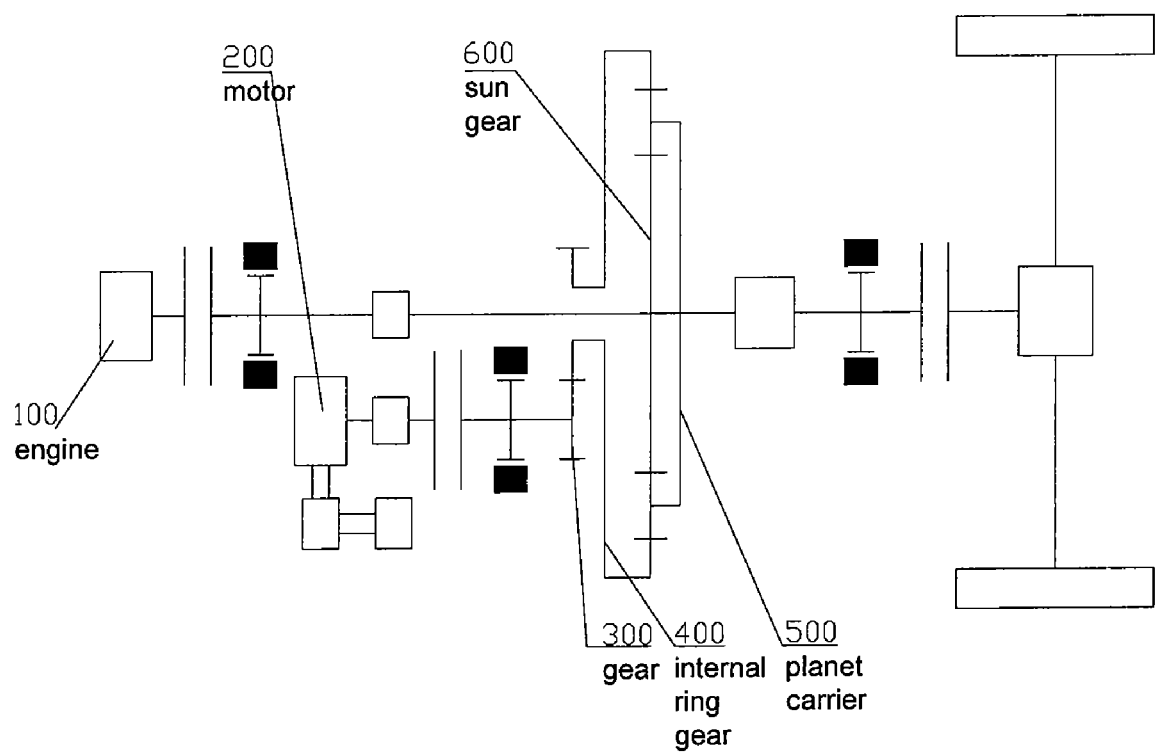
FIG. 1 is a schematic view of the known driving system in CN2693516Y.
Figure 2:
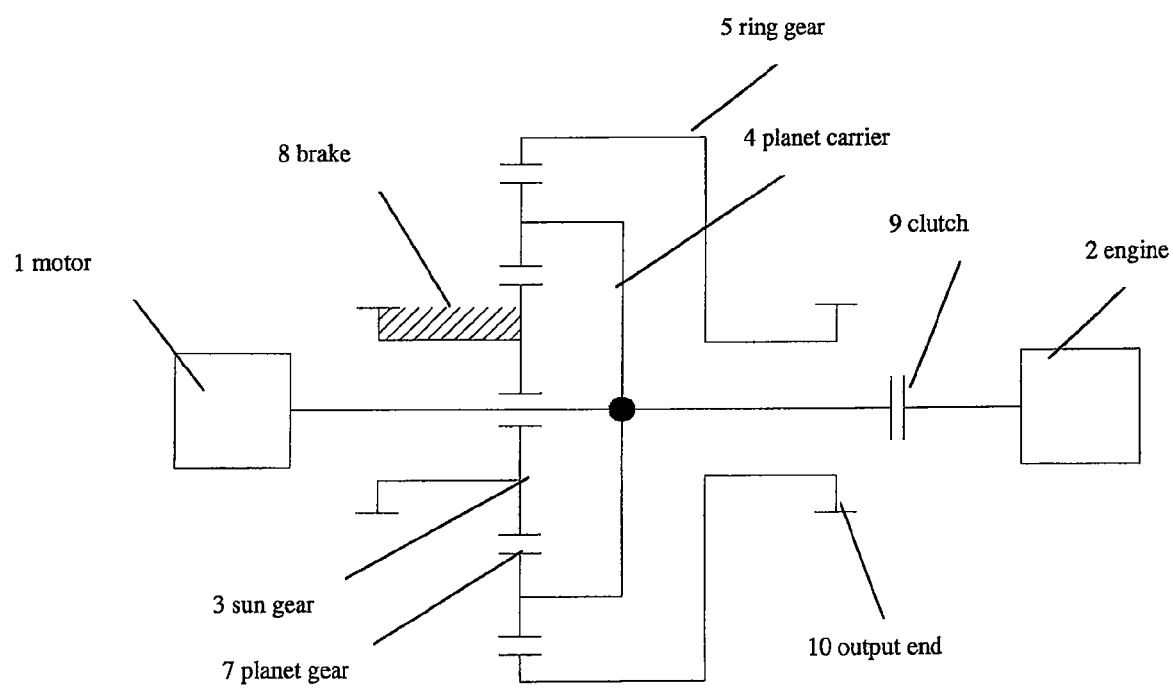
FIG. 2 is a schematic view of the driving system according to an embodiment in the present invention.

Referring to FIG. 2, according to a specific embodiment of the present invention, a hybrid power driving system includes a motor 1 (also referred to as the driving motor or electric motor), an engine 2, a clutch 9, a brake 8, an output end 10, and a planetary gear mechanism having a first rotating component, a second rotating component and a third rotating component, wherein the motor 1 is coupled to the first rotating component, the engine 2 is connected with the first rotating component via the clutch 9, and the brake 8 is coupled to the second rotating component to control the second rotating component to be in a locked position or in an unlocked position. The output end 10 is coupled to the third rotating component.

In one embodiment, motor 1 and engine 2 are connected with the first rotating component, and the first rotating component functions as a power input component, while the second rotating component is locked and the third rotating component is set as a power output component.

According to another embodiment, a hybrid power driving system includes the motor 1, the engine 2, the clutch 9, the brake 8, the output end 10, and a planet gear mechanism having a first rotating component, a second rotating component and a third rotating component. In this embodiment, the motor 1 is coupled with the first rotating component, and the engine 2 is connected with the first rotating component via the clutch 9. The brake 8 is coupled with the second rotating component to control the second rotating component to be locked or unlocked, and the output end 10 is coupled with the third rotating component.

In one embodiment, the motor 1 and the engine 2 are connected with the first rotating component, and the first rotating component functions as a power input component, while the second rotating component is locked, and the third rotating component is set as a power output component. Therefore, the structure of the present hybrid power driving system is compact, can be precisely controlled, and is reliable.

Figure 3:
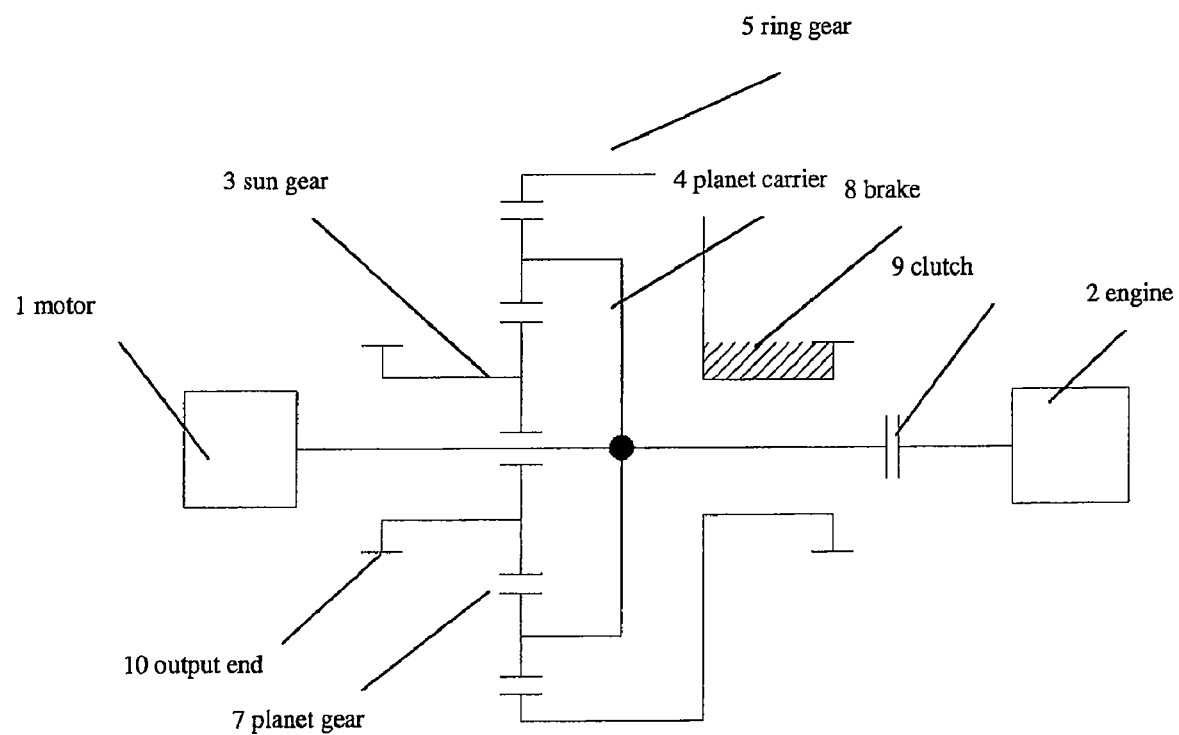
FIG. 3 is a schematic view of the driving system according to another embodiment in the present invention.

As shown in FIG. 2 and FIG. 3, the planet gear mechanism includes a sun gear 3, a ring gear 5, a planet carrier 4, which carries planet gears 7, which in turn engage both the sun gear 3 and ring gear 5. Note that the sun gear 3, the planet carrier 4 and the ring gear 5 can interchangeably be any of the first rotating component, the second rotating component, the third rotating component. Therefore, motor 1 and engine 2 can be coupled to any of the sun gear 3, the planet carrier 4 and the ring gear 5. The components are fully interchangeable with respect to functionality. According to another embodiment in the present invention, the first rotating component is the sun gear 3, and the motor 1 is coupled to sun gear 3, while engine 2 is connected with the sun gear 3 via clutch 9.

According to one example, the second rotating component is planet carrier 4, and the brake 8 is coupled to planet carrier 4 so as to lock the planet carrier 4 in a fixed position. The sun gear 3, which is connected with motor 1 and engine 2, is the power input component, while the ring gear 5 is the power output component, which transmits power to output end 10.

According to another example of the present example, the second rotating component is the ring gear 5, and the brake 8 is coupled to the ring gear 5 and locks the ring gear in a fixed position. The sun gear 3, which is connected with motor 1 and engine 2, is power input component, while the planet carrier 4 is the power output component, which transmits power to output end 10.

According to another embodiment of the present invention, the first rotating component is ring gear 5, the motor 1 is coupled to the ring gear 5, and the engine 2 is connected with ring gear 5 via the clutch 9.

According to one embodiment, the second rotating component is the planet carrier 4, and the brake 8 is coupled to planet carrier 4 and locks the planet carrier 4. In the present example, the ring gear 5, which is connected with the motor 1 and the engine 2, is the power input component, while the gear 3 is the power output component that transmits power to output end 10.

According to another example, the second rotating component is the sun gear 3, and the brake 8 is coupled to the sun gear 3 so as to lock the sun gear 3 in a fixed position. In this example, the ring gear 5, which is connected with the motor 1 and the engine 2, is the power input component, while the planet carrier 4 is the power output component, which transmits power to output end 10.

In a preferred embodiment, the first rotating component is the planet carrier 4 of the planet gear mechanism. Because the planet carrier 4 is located between the sun gear 3 and the ring gear 5, the rotating component at one side of planet carrier 4 can be used as power input component, while the rotating component at the other side can be used as power output component. Interference or adverse effect in structure are reduced, and the overall structure and components are compact.

In another embodiment, the second rotating component is the sun gear 3 of the planet gear mechanism, and the third rotating component is the ring gear 5 of the planet gear mechanism.

Therefore, in the above embodiment, the planet carrier 4, which is connected with motor 1 and engine 2, is power input component, while the brake 8 is coupled to sun gear 3 and locks the sun gear 3. The ring gear 5 is the power output component, which transmits power to output end 10, as shown in FIG. 2.

Refer to FIG. 2, the motor 1 is coupled to the planet carrier 4, for example, by a main shaft of the motor 1, and can be directly connected with planet carrier (for example, using a be splined connection), or via a shaft connector configured to connect the main shaft of motor 1 and the planet carrier 4. Therefore, the planet carrier 4 and the main shaft of motor 1 will work synchronously. The engine 2 is connected with planet carrier 4 via the clutch 9. When clutch 9 engages, the main shaft of the engine 2 is connected with planet carrier 4. Thus, the main shaft of the engine 2 works synchronously with the planet carrier 4 and the motor 1. When the clutch 9 disengages, the shafts of planet carrier 4 and the engine 2 will separate, and no power will be transferred between each other. The clutch 9 can be any type of clutch that can couple and decouple the connection between the main shaft of the planet carrier 4 and the main shaft of the engine 2. For example, the clutch may be a positive clutch, a jaw clutch and the like.

The brake 8 can be any device that can control sun gear 3 to be locked and unlocked, for example, the positive clutch.

The output end 10 can be a linkage gear or may be a component of the ring gear 5, and preferably rotates synchronously with the ring gear 5. The output end 10 transmits the power of the ring gear 5 to the wheels via a gear box or differential mechanism so as to drive the vehicle.

As shown in FIG. 2, after the brake 8 is engaged and locks the sun gear 3, it remains stable under the action of brake 8. Because the sun gear 3 is not fixed with the main shaft of the motor 1 and the planet carrier 4, it will not affect the movement of the motor 1 and the planet carrier 4.

According to the above embodiment of FIG. 2, the first rotating component is the planet carrier 4, the second rotating component is the sun gear 3 and the third rotating component is the ring gear 5. The power of the motor 1 and/or the engine 2 is transmitted to the ring gear 5 via the planet carrier 4, and is further transmitted to the output end 10.

The motor 1 usually employs an energy storage device (not shown) to supply power. The energy storage device can be rechargeable batteries, fuel cells, and the like.

The detailed working process under different working modes will be described following in conjunction of FIG. 2.

In the pure motor driving mode, the energy storage device of the driving motor 1 has enough energy so that the vehicle is driven only by the motor 1. At this time, the clutch 9 disengages, the brake 8 locks the sun gear 3 in a fixed position, and the power of the motor 1 is transmitted to the output end 10 via the planet carrier 4 and the ring gear 5.

As the clutch 9 disengages, the motor 1 and the planet carrier 4 are separated from the engine 2, thus the rotation of the motor 1 and the planet carrier 4 will not be effected by the engine 2. In this situation, the sun gear 3 is locked via the brake 8, while the planet carrier 4 is the power input component, and the ring gear 5 is the power output component. Therefore, the power of the motor 1 is transmitted to the planet carrier 4 and then output by the ring gear 5 to the output end 10.

Under this working mode, engine 2 need not to be started, and only the motor 1 works as the power source to drive the vehicle. Thus, only electricity is consumed, while fuel is not, which is environmentally friendly.

In the pure engine driving working mode, the energy storage device does not have sufficient electricity, thus the engine 2 is required to drive the vehicle. At this time, the clutch 9 engages, the brake 8 locks sun gear 3, and the power of the engine 2 is transmitted to the output end 10 via the clutch 9, the planet carrier 4 and the ring gear 5.

As the clutch 9 engages, the power of the engine 2 is transmitted to the planet carrier 4 via the clutch 9. In this situation, the sun gear 3 is locked via the brake 8, while the planet carrier 4 is the power input component and the ring gear 5 is the power output component. Therefore, the power of the engine 2 is transmitted to the planet carrier 4 and then output by the ring gear 5 to the output end 10. There are two working modes for the motor 1. In one mode, the engine 2 drives the planet carrier 4 to rotate, while it also drives the motor 1 to generate electricity. In this case, the motor 1 converts mechanical energy into electricity to further be stored in the energy storage device. In the other mode, the electrical connection between the motor 1 and the energy storage device is cut (e.g., the circuit is opened). In this case, the main shaft of motor 1 is idly rotating and will not consume any part of the mechanical energy output by the engine 2.

Under this working mode, the engine 2 works as the power source to drive the vehicle. The system may also operate in both a motor and engine driving working mode. In this mode, while the load is relatively high, and relatively great power is needed, the motor 1 and the engine 2 work together to drive the vehicle. At this time, the clutch 9 is engaged, the brake 8 locks sun gear 3, and the power of the motor 1 and the engine 2 is transmitted to output end 10 via planet carrier 4 and the ring gear 5. The motor 1 transmits power directly to the planet carrier 4, the engine 2 transmits power to planet carrier 4 via the engaged clutch 9, and therefore the power output by the motor 1 and the engine 2 will work together to power the planet carrier 4. In this situation, the sun gear 3 is locked via the brake 8, while the carrier 4 is power input component, and while the ring gear 5 is the power output component. Therefore, the power of the motor 1 and the engine 2 is transmitted to the planet carrier 4, and is then output by the ring gear 5 to the output end 10.

Under this working mode, because the engine 2 and motor 1 work together, the power is increased. In the parking generating working mode, when the power of the energy storage device is not sufficient, and there is no external power to charge the energy storage device, the vehicle may be parked and the engine 2 can be used to drive motor 1 to generate electricity and charge the energy storage device. At this time, the clutch 9 is engaged, the brake 8 unlocks the sun gear 3, the planet carrier 4 is the power input component, and the unlocked sun gear 3 is the power output component. In this case, while the engine 2 drives the planet carrier 4 to rotate via the clutch 9, the engine 2 drives the main shaft of motor 1 to rotate. The motor 1 then converts the rotation mechanical energy into electricity and charges the storage device. While at this time, the sun gear 3 rotates idly and does not generate power.

Under this working mode, the engine 2 drives the motor 1 to generate electricity to supply in the energy storage device.

Further, the motor 1 can be used to start engine 2. In this mode, the clutch 9 is engaged and the brake 8 unlocks sun gear 3. In this situation, the rotation of the main shaft of the motor 1 will be transmitted to the main shaft of the engine 2 via the planet carrier 4. Thus, the motor 1 can be used as a starter motor for the engine 2. When the vehicle brakes or decelerates, the motor 1 may convert part of the mechanical energy of planet carrier 4 into electricity to save energy.

According to another embodiment, the first rotating component is the planet carrier 4 of the planet gear mechanism, the second rotating component is the ring gear 5 of the planet gear mechanism, the third rotating component is the sun gear 3 of the planet gear mechanism.

As shown in FIG. 3, the motor 1 is connected with the planet carrier 4 and the engine 2 is connected with the planet carrier 4 via the clutch 9. The brake 8 controls the ring gear 5 to be locked or unlocked. Therefore, in this embodiment, the planet carrier 4, which is connected with the motor 1 and the engine 2, is the power input component, and the sun gear 3 is the power output component, which transmits the power to output end 10.

In the embodiment shown in FIG. 2, the brake 8 is used to control the sun gear 3, and the ring gear 5 usually works as the power output component. In contrast, in the embodiment shown in FIG. 3, the brake 8 is used to control the ring gear 5, and the sun gear 3 usually works as the power output component. Therefore, in the above two embodiments, output end 10 is respectively located on the ring gear 5 and the sun gear 3. The working modes of the embodiment shown in FIG. 3 will be explained in accordance with a pure motor driving working mode. Under this working mode, the clutch 9 is disengaged, the brake 8 locks the ring gear 5, and the power of the motor 1 is transmitted to the output end 10 via the planet carrier 4 and the sun gear 3.

In the pure engine driving working mode, the clutch 9 is engaged, the brake 8 locks the ring gear 5, and the power of the engine 2 is transmitted to output end 10 via the clutch 9, the planet carrier 4 and the sun gear 3.

Hybrid driving by both motor and engine working mode: under this working mode, the clutch 9 is engaged, the brake 8 locks the ring gear 5, and the power of the motor 1 and the engine 2 are both transmitted to the planet carrier 4. Thus, the power of the motor 1 and the engine 2 are transmitted to the output end 10 via the planet carrier 4 and the sun gear 3.

According to the embodiment of FIG. 3, under the parking generating working mode, the braking and decelerating working mode, and while the motor 1 is used as a starter motor, the working principles are the same as the embodiment shown in FIG. 2 and it will not be repeated. Although the preferred embodiments of the present invention have been described above, the present invention is not limited to the above words, those who skilled in this field shall understand that many amendments, replacements or variations may be made according to the present invention, which are all within the protection of the present invention.

We claim:

1. A hybrid power driving system comprising:
   a planetary gear mechanism having a planet carrier configured to retain a plurality of planetary gears, a sun gear of the planetary gear mechanism, and a ring gear of the planetary gear mechanism;

an electric motor directly operatively coupled to the planet carrier;

a clutch;

an internal-combustion engine operatively coupled to the planet carrier through the clutch, the internal-combustion engine and the electric motor configured to provide a parallel-driving system and to provide separate power outputs to the planet carrier;

a brake operatively coupled to the sun gear and configured to control the sun gear to operate in a locked position or in an unlocked position; and the ring gear operatively coupled to an output end to provide rotational power;

wherein the electric motor provides starting power to the engine when the clutch is engaged and the sun gear is in an unlocked position.

2. The hybrid power driving system according to claim 1, wherein the brake is a positive clutch.

3. The hybrid power driving system according to claim 1, wherein the output end is a linkage gear.

4. The hybrid power driving system according to claim 1, wherein the output end transmits the rotational power to the wheels through a gear box.

5. The hybrid power driving system according to claim 1, wherein the electric motor is coupled to the planet carrier via a main shaft having a splined connection.

6. The hybrid power driving system according to claim 1, wherein the electric motor is coupled to the planet carrier by a main shaft, and wherein the main shaft rotates synchronously with the planet carrier.

7. The hybrid power driving system according to claim 1, wherein the hybrid driving system is configured to operate in a pure electric motor driving mode while:
the clutch is disengaged, and
the brake locks the sun gear, and
power from the electric motor is transmitted to the planet carrier, and
the ring gear transmits power to the output end.

8. The hybrid power driving system according to claim 1, wherein the hybrid driving system is configured to operate in a pure engine driving working mode while:
the clutch is engaged, and
the brake locks the sun gear, and
power of the engine is transmitted to the output end through the clutch, the planet carrier, and the ring gear.

9. The hybrid power driving system according to claim 8, wherein the engine drives the electric motor to generate electricity.

10. The hybrid power driving system according to claim 8, wherein the electric motor is in an idle rotating state when the hybrid driving system operates in the pure engine driving working mode.

11. The hybrid power driving system according to claim 1, wherein the hybrid driving system is configured to operate in an engine and electric motor driving working mode while:
the clutch is engaged, and
the brake locks the sun gear, and
power from the electric motor and the engine is transmitted to the output end via the planet carrier and the ring gear.

12. The hybrid power driving system according to claim 1, wherein the hybrid driving system is configured to operate in a parking-generating mode while:
the clutch is engaged, and
the brake unlocks the sun gear, and
the engine drives the electric motor to generate electricity.

13. The hybrid power driving system according to claim 1, wherein the electric motor is configured to start the engine, while:
the clutch is engaged, and
the brake unlocks sun gear, and
wherein rotation of the main shaft of the electric motor is transmitted to the engine via the planet carrier.

14. The hybrid power driving system according to claim 1, wherein the electric motor is configured to convert a portion of mechanical energy received from the planet carrier into electricity.

15. A hybrid power driving system comprising:
a planetary gear mechanism having a planet carrier, a sun gear, and a ring gear;
an electric motor directly operatively coupled to the planet carrier;
a clutch;
an internal-combustion engine operatively coupled to the planet carrier through the clutch, the internal-combustion engine and the electric motor configured to provide a parallel-driving system and to provide separate power outputs to the planet carrier;
a brake operatively coupled to the sun gear and configured to control the sun gear to operate in a locked position or in an unlocked position; and
the ring gear operatively coupled to an output end to provide rotational power;
wherein the electric motor provides starting power to the engine when the clutch is engaged and the sun gear is in an unlocked position.

* * * * *